(12) United States Patent
Chen

(10) Patent No.: US 11,432,673 B2
(45) Date of Patent: Sep. 6, 2022

(54) AIR PRESSURE COOKER

(71) Applicant: ZHEJIANG TIANXI KITCHEN APPLIANCE CO., LTD., Zhejiang (CN)

(72) Inventor: Xiyan Chen, Zhejiang (CN)

(73) Assignee: ZHEJIANG TIANXI KITCHEN APPLIANCE CO., LTD.

( * ) Notice: Subject to any disclaimer, the term of this patent is extended or adjusted under 35 U.S.C. 154(b) by 560 days.

(21) Appl. No.: 16/669,158

(22) Filed: Oct. 30, 2019

(65) Prior Publication Data

US 2020/0205597 A1 Jul. 2, 2020

(51) Int. Cl.
A47J 37/06 (2006.01)
A47J 27/08 (2006.01)
A47J 27/086 (2006.01)
A47J 27/092 (2006.01)

(52) U.S. Cl.
CPC ....... *A47J 27/0817* (2013.01); *A47J 27/0804* (2013.01); *A47J 27/086* (2013.01); *A47J 27/092* (2013.01); *A47J 37/0641* (2013.01)

(58) Field of Classification Search
CPC .. A47J 27/0802; A47J 27/0817; A47J 27/086; A47J 37/0641; A47J 37/0754

USPC .......................................................... 99/476
See application file for complete search history.

(56) References Cited

U.S. PATENT DOCUMENTS

| | | | | |
|---|---|---|---|---|
| 6,936,795 B1 * | 8/2005 | Moon | ................. | A47J 37/0629 |
| | | | | 219/400 |
| 10,653,270 B2 * | 5/2020 | Gill | ...................... | A47J 27/0804 |
| 2017/0245686 A1 * | 8/2017 | Man | ..................... | A47J 37/0641 |
| 2021/0038012 A1 * | 2/2021 | Huang | ................. | A47J 27/086 |

* cited by examiner

*Primary Examiner* — Reginald Alexander

(57) ABSTRACT

An air pressure cooker comprising an upper cover and a bottom cover, wherein an uncovering knob and a heat insulation cover are arranged on the upper cover; the uncovering knob is fixedly connected on the right side of the outer surface of the upper cover, and the heat insulation cover is fixedly connected inside the upper cover; a handle locking block is arranged underneath the uncovering knob, and a motor, a switch connecting rod, cold wind fan blades and a heating tube cover are arranged on the heat insulation cover; the motor is fixedly connected in the middle of the upper end of the heat insulation cover, and the switch connecting rod is fixedly connected on the right side of the heat insulation cover; the cold wind fan blades are movably connected inside the heat insulation cover.

9 Claims, 3 Drawing Sheets

AIR PRESSURE COOKER

TECHNICAL FIELD OF THE INVENTION

The present invention relates to the technical field of manufacturing kitchen appliances, and more particularly, to an air pressure cooker.

BACKGROUND OF THE INVENTION

A pressure cooker, also known as a pressure kettle or a pressure pot, is a kitchen appliance, which imposes pressure on water by utilizing the physical phenomenon that the boiling point of water can be increased under a higher pressure, thereby allowing water to reach a higher temperature without boiling. Thus, cooking efficiency can be greatly improved. The steamed or boiled food can be heated to a temperature over 100 degrees Celsius. In high-altitude regions, using the pressure cooker can effectively prevent the food from being undercooked due to the decrease of the boiling point of water.

In the prior art, traditional pressure cookers have shortcomings. For instance, a traditional pressure cooker cannot possess functions of both air fryer and electric pressure cooker. Namely, the baking and frying functions of the air fryer, and the stewing and boiling functions of the electric pressure cooker cannot be simultaneously achieved. Thus, customers' requirements of food variety and better taste cannot be satisfied.

SUMMARY OF THE INVENTION

The purpose of the present invention is to solve the shortcomings in the prior art by providing an air pressure cooker.

To achieve the above purpose, the present invention adopts the following technical solution:

An air pressure cooker comprising an upper cover and a bottom cover, wherein an uncovering knob and a heat insulation cover are arranged on the upper cover; the uncovering knob is fixedly connected on the right side of the outer surface of the upper cover, and the heat insulation cover is fixedly connected inside the upper cover; a handle locking block is arranged underneath the uncovering knob, and a motor, a switch connecting rod, cold wind fan blades and a heating tube cover are arranged on the heat insulation cover; the motor is fixedly connected in the middle of the upper end of the heat insulation cover, and the switch connecting rod is fixedly connected on the right side of the heat insulation cover; the cold wind fan blades are movably connected inside the heat insulation cover, and the heating tube cover is fixedly connected underneath the heat insulation cover; a micro switch is arranged on the switch connecting rod, and hot wind fan blades are arranged underneath the heating tube cover; a heating tube is arranged underneath the hot wind fan blades, and a middle ring is arranged underneath the heating tube; a cooker cover is arranged underneath the middle ring, and an exhaust valve and a pressure limiting valve are arranged on the cooker cover; a sealing support and an inner cover assembly are arranged inside the cooker cover, and a sealing ring is arranged on the inner cover assembly; a power socket and a surrounding edge are arranged on the bottom cover, wherein the power socket is fixedly connected on the right side of the bottom cover, and the surrounding edge is fixedly connected at the outer edge of the bottom cover; a control panel and a water box support are arranged on the surrounding edge, wherein the control panel is fixedly connected on the right surface of the surrounding edge, and the water box support is fixedly connected on the left surface of the surrounding edge; a water receiving box is arranged on the water box support, and a handle is arranged inside the bottom cover; a handle outer ring is arranged above the handle, and an outer pot is arranged above the handle outer ring; an adjustable temperature control, a frying basket, a magnet-steel, a heating plate and an inner pot are arranged on the outer pot; the adjustable temperature control is fixedly connected on the left side of the bottom of the outer pot, and the magnet-steel is connected to the middle of the interior of the outer pot through rivets; the heating plate is fixedly connected at the upper end of the magnet-steel, and the inner pot is movably connected to the upper surface of the heating plate; the frying basket is located inside the inner pot, and a frying basket handle is arranged on the frying basket.

In another preferred embodiment, the uncovering knob is connected to the upper cover through the handle locking block, and the heat insulation cover is connected to the interior of the upper cover through rivets.

In another preferred embodiment, the motor is connected to the middle of the upper end of the heat insulation cover through rivets, and the cold wind fan blades are connected to the interior of the heat insulation cover through the motor. The heating tube cover is connected to the bottom of the heat insulation cover through rivets.

In another preferred embodiment, the hot wind fan blades are connected to the middle of the bottom of the heating tube cover through rivets. The heating tube is connected to the bottom of the heating tube cover through rivets, and is located underneath the hot wind fan blades.

In another preferred embodiment, the heating tube cover is connected to the upper portion of the cooker cover through the middle ring, and the exhaust valve is connected to the rear portion of the upper surface of the cooker cover through rivets. The pressure limiting valve is connected to the front portion of the upper surface of the cooker cover through rivets, and the inner cover assembly is connected to the interior of the cooker cover through the sealing support.

In another preferred embodiment, the lower end of the surrounding edge is embedded with the bottom cover, and is connected to the bottom cover through rivets. The water receiving box is connected to the surrounding edge through the water box support, and the water box support is connected to the surrounding edge through rivets. The control panel is embedded with the right side of the surrounding edge.

In another preferred embodiment, the handle is connected to the interior of the bottom cover through rivets, and the handle outer ring is embedded with the inner edge of the handle. The outer pot is embedded with the inner edge of the handle. The outer pot is embedded with the inner side of the handle outer ring.

In another preferred embodiment, the frying basket is made of stainless steel, and is embedded with the inner pot. The frying basket handle is connected to the right end of the frying basket through rivets.

In another preferred embodiment, the bottom of the heating plate is embedded with the upper end of the magnet-steel, and is connected to the bottom of the outer pot through rivets.

Compared with the prior art, the present invention has the following advantages:

The air pressure cooker of the present invention combines functions of both air fryer and electric pressure cooker. Through simply changing the accessories of the upper cover, the baking and frying functions of the air fryer, and the stewing and boiling functions of the electric pressure cooker can all be achieved. Thus, customers' requirements on food variety and better taste can be satisfied.

BRIEF DESCRIPTION OF THE DRAWINGS

Other features, purposes and advantages of the present invention will become more significant by reading the detailed description of the non-restrictive embodiments made in the Figures below.

IN THE FIGURES

Upper Cover—1, Bottom Cover—2, Uncovering Knob—3, Heat Insulation Cover—4, Handle Locking Block—5, Motor—6, Switch Connecting Rod—7, Cold Wind Fan Blades—8, Heating Tube Cover—9, Micro Switch—10, Hot Wind Fan Blades 11, Heating Tube 12, Middle Ring 13, Cooker Cover 14, Exhaust Valve—15, Pressure Limiting Valve—16, Sealing Support—17, Inner Cover Assembly—18, Sealing Ring—19, Power Socket—20, Surrounding Edge—21, Control Panel—22, Water Box Support—23, Water Receiving Box—24, Handle—25, Handle Outer Ring—26, Outer Pot—27, Adjustable Temperature Control—28, Frying Basket—29, Magnet Steel—30, Heating Plate—31, Inner Pot—32, Frying Basket Handle—33.

DETAILED DESCRIPTION OF THE INVENTION

Drawings and detailed embodiments are combined hereinafter to elaborate the technical solutions of the present invention. It should be clarified that embodiments described hereinafter are only a part but not all of the embodiments of the present invention.

In the description of the present invention, it should be clarified that directions or position relationships indicated by the terms "upper", "lower", "front", "back", "left", "right" and "top" are directions or position relationships shown in the Figures, which are merely used to facilitate and simplify the description of the present invention, but not to indicate or imply a specific direction of a device or element, and thus cannot be understood as a limitation to the present invention.

Figure 1:
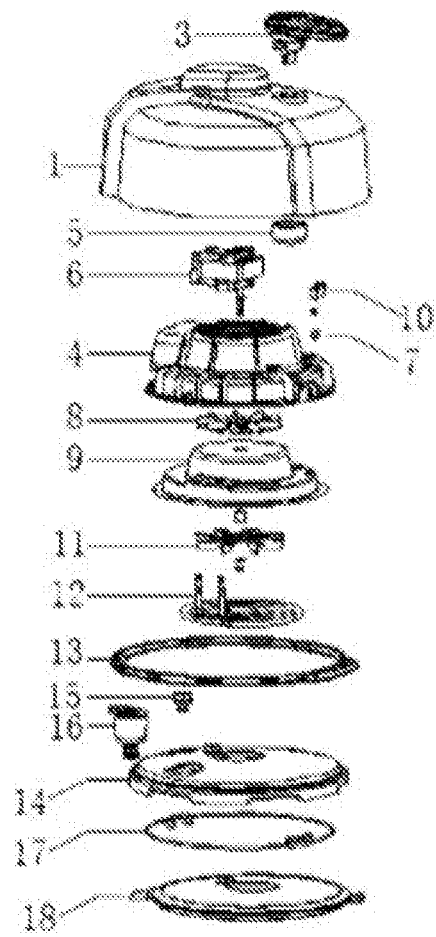
FIG. 1 is an explosive view of the air-energy cooker cover of the present invention.
Figure 2:
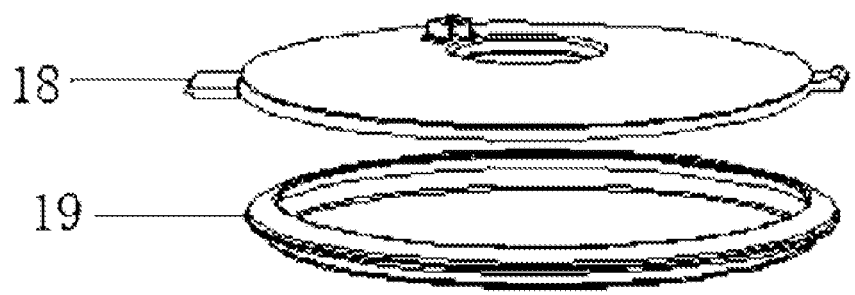
FIG. 2 is an assembly diagram of the inner cover assembly of the present invention.
Figure 3:
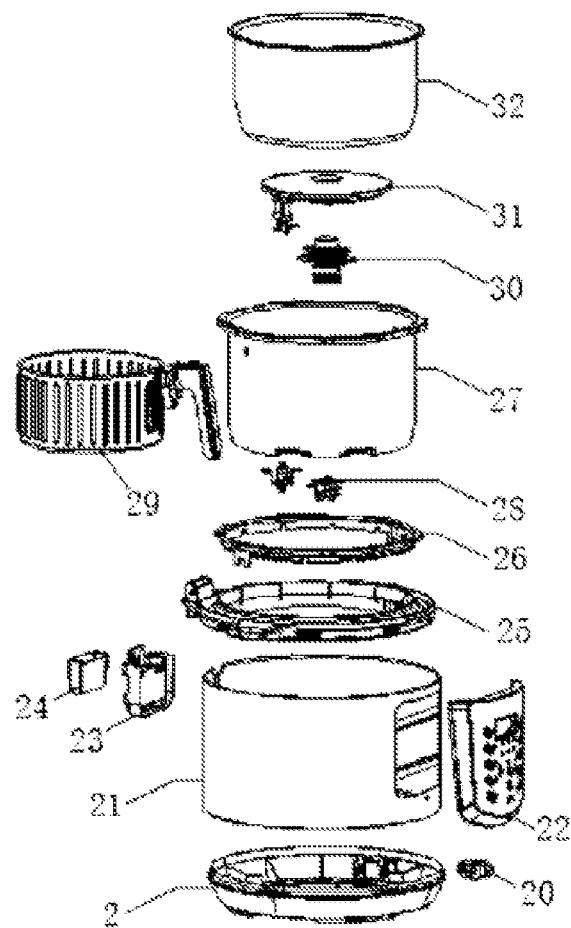
FIG. 3 is an assembly diagram of the base of the present invention.
Figure 4:
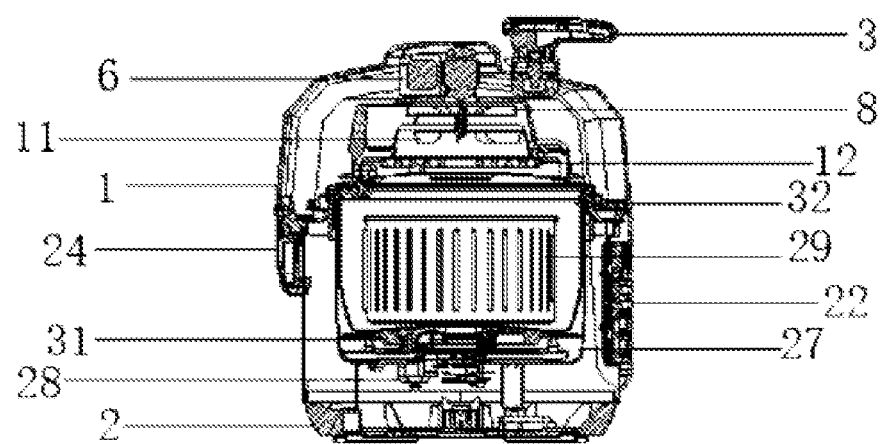
FIG. 4 is an assembly diagram of the pressure cooker of the present invention.
Figure 5:
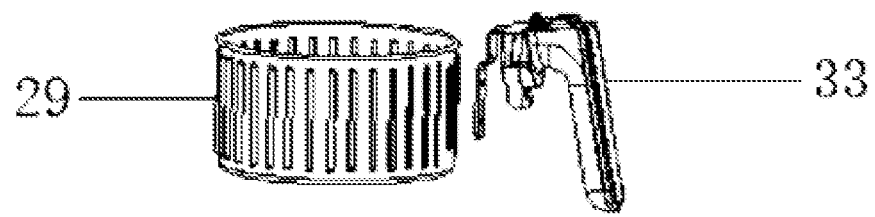
FIG. 5 is a structural diagram of the frying basket of the present invention.

As shown in FIGS. 1-5, the present invention provides a technical solution: an air pressure cooker comprising an upper cover 1 and a bottom cover 2, wherein an uncovering knob 3 and a heat insulation cover 4 are arranged on the upper cover 1. The uncovering knob 3 is fixedly connected on the right side of the outer surface of the upper cover 1, and the heat insulation cover 4 is fixedly connected inside the upper cover 1. A handle locking block 5 is arranged underneath the uncovering knob 3, and a motor 6, a switch connecting rod 7, cold wind fan blades 8 and a heating tube cover 9 are arranged on the heat insulation cover 4. The motor 6 is fixedly connected in the middle of the upper end of the heat insulation cover 4, and the switch connecting rod 7 is fixedly connected on the right side of the heat insulation cover 4. The cold wind fan blades 8 are movably connected inside the heat insulation cover 4, and the heating tube cover 9 is fixedly connected underneath the heat insulation cover 4. A micro switch 10 is arranged on the switch connecting rod 7, and hot wind fan blades 11 are arranged underneath the heating tube cover 9. A heating tube 12 is arranged underneath the hot wind fan blades 11, and a middle ring 13 is arranged underneath the heating tube 12. A cooker cover 14 is arranged underneath the middle ring 13, and an exhaust valve 15 and a pressure limiting valve 16 are arranged on the cooker cover 14. A sealing support 17 and an inner cover assembly 18 are arranged inside the cooker cover 14, and a sealing ring 19 is arranged on the inner cover assembly 18. A power socket 20 and a surrounding edge 21 are arranged on the bottom cover 2, wherein the power socket 20 is fixedly connected on the right side of the bottom cover 2, and the surrounding edge 21 is fixedly connected at the outer edge of the bottom cover 2. A control panel 22 and a water box support 23 are arranged on the surrounding edge 21, wherein the control panel 22 is fixedly connected on the right surface of the surrounding edge 21, and the water box support 23 is fixedly connected on the left surface of the surrounding edge 21. A water receiving box 24 is arranged on the water box support 23, and a handle 25 is arranged inside the bottom cover 2. A handle outer ring 26 is arranged above the handle 25, and an outer pot 27 is arranged above the handle outer ring 26. An adjustable temperature control 28, a frying basket 29, a magnet-steel 30, a heating plate 31 and an inner pot 32 are arranged on the outer pot 27. The adjustable temperature control 28 is fixedly connected on the left side of the bottom of the outer pot 27, and the magnet-steel 30 is connected to the middle of the interior of the outer pot 27 through rivets. The heating plate 31 is fixedly connected at the upper end of the magnet-steel 30, and the inner pot 32 is movably connected to the upper surface of the heating plate 31. The frying basket 29 is located inside the inner pot 32, and a frying basket handle 33 is arranged on the frying basket 29.

In another aspect of the present invention, the uncovering knob 3 is connected to the upper cover 1 through the handle locking block 5, and the heat insulation cover 4 is connected to the interior of the upper cover 1 through rivets.

In another aspect of the present invention, the motor 6 is connected to the middle of the upper end of the heat insulation cover 4 through rivets, and the cold wind fan blades 8 are connected to the interior of the heat insulation cover 4 through the motor 6. The heating tube cover 9 is connected to the bottom of the heat insulation cover 4 through rivets.

In another aspect of the present invention, the hot wind fan blades 11 are connected to the middle of the bottom of the heating tube cover 9 through rivets. The heating tube 12 is connected to the bottom of the heating tube cover 9 through rivets, and is located underneath the hot wind fan blades 11.

In another aspect of the present invention, the heating tube cover 9 is connected to the upper portion of the cooker cover 14 through the middle ring 13, and the exhaust valve 15 is connected to the rear portion of the upper surface of the cooker cover 14 through rivets. The pressure limiting valve 16 is connected to the front portion of the upper surface of the cooker cover 14 through rivets, and the inner cover assembly 18 is connected to the interior of the cooker cover 14 through the sealing support 17.

In another aspect of the present invention, the lower end of the surrounding edge 21 is embedded with the bottom cover 2, and is connected to the bottom cover 2 through rivets. The water receiving box 24 is connected to the surrounding edge 21 through the water box support 23, and the water box support 23 is connected to the surrounding edge 21 through rivets. The control panel 22 is embedded with the right side of the surrounding edge 21.

In another aspect of the present invention, the handle 25 is connected to the interior of the bottom cover 2 through rivets, and the handle outer ring 26 is embedded with the inner edge of the handle 25. The outer pot 27 is embedded with the inner edge of the handle 25. The outer pot 27 is embedded with the inner side of the handle outer ring 26.

In another aspect of the present invention, the frying basket is made of stainless steel, and is embedded with the inner pot 32. The frying basket handle 33 is connected to the right end of the frying basket 29 through rivets.

In another aspect of the present invention, the bottom of the heating plate 31 is embedded with the upper end of the magnet-steel 30, and is connected to the bottom of the outer pot 27 through rivets.

During use, when there's a need to use the functions of an air fryer, the inner cover assembly 18 can be removed from the upper cover 1. At this point, the switch connecting rod 7 of the upper cover 1 is popped out, and the micro switch 10 is in a off state. The hot air circulation heating system (mainly composed of the motor 6, the cold wind fan blades 8, the heating tube cover 9, the hot wind fan blades 11 and the heating tube 12) of the upper cover 1 is switched on, enabling the upper cover 1 to stay in a standby state. Thus, the user can choose a function according to the food type. At this point, the pressure cooker stays in an air fryer working mode, namely, capable of achieving the baking and frying functions. When there's a need to use the functions of the electric pressure cooker, the inner cover assembly 18 is snap-fitted with the upper cover 1, the switch connecting rod 7 of the upper cover 1 turns upwards, and the micro switch 10 is in an on state. When the hot air circulation heating system (mainly composed of the motor 6, the cold wind fan blades 8, the heating tube cover 9, the hot wind fan blades 11 and the heating tube 12) of the upper cover 1 is switched off, the present invention stays in a pressure cooker working mode, namely, capable of achieving the stewing and boiling functions.

The upper cover 1, the bottom cover 2, the uncovering knob 3, the heat insulation cover 4, the handle locking block 5, the motor 6, the switch connecting rod 7, the cold wind fan blades 8, the heating tube cover 9, the micro switch 10, the hot wind fan blades 11, the heating tube 12, the middle ring 13, the cooker cover 14, the exhaust valve 15, the pressure limiting valve 16, the sealing support 17, the inner cover assembly 18, the sealing ring 19, the power socket 20, the surrounding edge 21, the control panel 22, the water box support 23, the water receiving box 24, the handle 25, the handle outer ring 26, the outer pot 27, the adjustable temperature control 28, the frying basket 29, the steel magnet 30, the heating plate 31, the inner pot 32 and the frying basket handle 33 are all standards parts or parts known to those skilled in the art. The structure and principle are all known to those skilled in the art, or can be known through technical manuals or conventional experiments. Through simply changing the accessories of the upper cover 1, the baking and frying functions of the air fryer, and the stewing and boiling functions of the electric pressure cooker can all be achieved. Thus, customers' requirements on food variety and better taste can be satisfied.

The above shows and describes the basic principle, main technical features and advantages of the present invention, and it is obvious to those skilled in the art that the present invention is not limited to the details of the exemplary embodiments described above. Furthermore, the present invention can be realized in other specific forms without departing from the spirit or essential characteristics of the present invention. Thus, the above embodiments should only be considered as exemplary embodiments, but not ones aiming to limit the present invention. The scope of the present invention is defined by the claims. Any modification, equivalent replacement or improvement made within the spirit and principles of the present invention shall be included in the protective scope of the present invention. Any reference signs in the claims should not be regarded as the limitation to the claims involved.

In addition, it should be understood that, although the specification is described according to the embodiments, not every embodiment comprises only one independent technical solution. The description of the specification is only for the purpose of clarification. The technical solution of the invention should be used as a whole, and the technical solutions of the embodiments can be properly combined to form other embodiments that can be understood by those skilled in the art.

The invention claimed is:

1. An air pressure cooker, comprising:
an upper cover (1) and a bottom cover (2), wherein an uncovering knob (3) and a heat insulation cover (4) are arranged on the upper cover (1), wherein the uncovering knob (3) is fixedly connected on the right side of the outer surface of the upper cover (1), and the heat insulation cover (4) is fixedly connected inside the upper cover (1), wherein a handle locking block (5) is arranged underneath the uncovering knob (3), and a motor (6), a switch connecting rod (7), cold wind fan blades (8) and a heating tube cover (9) are arranged on the heat insulation cover (4), wherein the motor (6) is fixedly connected in the middle of the upper end of the heat insulation cover (4), and the switch connecting rod (7) is fixedly connected on the right side of the heat insulation cover (4), wherein the cold wind fan blades (8) are movably connected inside the heat insulation cover (4), and the heating tube cover (9) is fixedly connected underneath the heat insulation cover (4), wherein a micro switch (10) is arranged on the switch connecting rod (7), and hot wind fan blades (11) are arranged underneath the heating tube cover (9), wherein a heating tube (12) is arranged underneath the hot wind fan blades (11), and a middle ring (13) is arranged underneath the heating tube (12), wherein a cooker cover (14) is arranged underneath the middle ring (13), and an exhaust valve (15) and a pressure limiting valve (16) are arranged on the cooker cover (14), wherein a sealing support (17) and an inner cover assembly (18) are arranged inside the cooker cover (14), and a sealing ring (19) is arranged on the inner cover assembly (18), wherein a power socket (20) and a surrounding edge (21) are arranged on the bottom cover (2), wherein the power socket (20) is fixedly connected on the right side of the bottom cover (2), and the surrounding edge (21) is fixedly connected at the outer edge of the bottom cover (2), wherein a control panel (22) and a water box support (23) are arranged on the surrounding edge (21), wherein the control panel (22) is fixedly connected on the right surface of the surrounding edge (21), and the water box support (23) is fixedly connected on the left surface of the surrounding edge (21), wherein a water receiving box (24) is arranged on the water box support (23), and a handle

(25) is arranged inside the bottom cover (2), wherein a handle outer ring (26) is arranged above the handle (25), and an outer pot (27) is arranged above the handle outer ring (26), wherein an adjustable temperature control (28), a frying basket (29), a magnet-steel (30), a heating plate (31) and an inner pot (32) are arranged on the outer pot (27), wherein the adjustable temperature control (28) is fixedly connected to the left side of the bottom of the outer pot (27), and the magnet-steel (30) is connected to the middle of the interior of the outer pot (27) through rivets, wherein the heating plate (31) is fixedly connected at the upper end of the magnet-steel (30), and the inner pot (32) is movably connected to the upper surface of the heating plate (31), wherein the frying basket (29) is located inside the inner pot (32), and a frying basket handle (33) is arranged on the frying basket (29).

2. The air pressure cooker of claim 1, wherein the uncovering knob (3) is connected to the upper cover (1) through the handle locking block (5), and the heat insulation cover (4) is connected to the interior of the upper cover (1) through rivets.

3. The air pressure cooker of claim 1, wherein the motor (6) is connected to the middle of the upper end of the heat insulation cover (4) through rivets, and the cold wind fan blades (8) are connected to the interior of the heat insulation cover (4) through the motor (6), wherein the heating tube cover (9) is connected to the bottom of the heat insulation cover (4) through rivets.

4. The air pressure cooker of claim 1, wherein the hot wind fan blades (11) are connected to the middle of the bottom of the heating tube cover (9) through rivets, wherein the heating tube (12) is connected to the bottom of the heating tube cover (9) through rivets, and is located underneath the hot wind fan blades (11).

5. The air pressure cooker of claim 1, wherein the heating tube cover (9) is connected to the upper portion of the cooker cover (14) through the middle ring (13), and the exhaust valve (15) is connected to the rear portion of the upper surface of the cooker cover (14) through rivets, wherein the pressure limiting valve (16) is connected to the front portion of the upper surface of the cooker cover (14) through rivets, and the inner cover assembly (18) is connected to the interior of the cooker cover (14) through the sealing support (17).

6. The air pressure cooker of claim 1, wherein the lower end of the surrounding edge (21) is embedded with the bottom cover (2), and is connected to the bottom cover (2) through rivets, wherein the water receiving box (24) is connected to the surrounding edge (21) through the water box support (23), and the water box support (23) is connected to the surrounding edge (21) through rivets, wherein the control panel (22) is embedded with the right side of the surrounding edge (21).

7. The air pressure cooker of claim 1, wherein the handle (25) is connected to the interior of the bottom cover (2) through rivets, and the handle outer ring (26) is embedded with the inner edge of the handle (25), wherein the outer pot (27) is embedded with the inner edge of the handle (25), and the outer pot (27) is embedded with the inner side of the handle outer ring (26).

8. The air pressure cooker of claim 1, wherein the frying basket is made of stainless steel, and is embedded with the inner pot (32), wherein the frying basket handle (33) is connected to the right end of the frying basket (29) through rivets.

9. The air pressure cooker of claim 1, wherein the bottom of the heating plate (31) is embedded with the upper end of the magnet-steel (30), and is connected to the bottom of the outer pot (27) through rivets.

* * * * *